C. P. EBERSOLE.
LINK.
APPLICATION FILED JULY 7, 1915.

1,187,289.

Patented June 13, 1916.

Witnesses

Inventor
Christian P. Ebersole.
By Victor J. Evans
Attorney

UNITED STATES PATENT OFFICE.

CHRISTIAN P. EBERSOLE, OF CAMPBELLTOWN, PENNSYLVANIA.

LINK.

1,187,289.　　　　Specification of Letters Patent.　　Patented June 13, 1916.

Application filed July 7, 1915. Serial No. 38,531.

*To all whom it may concern:*

Be it known that I, CHRISTIAN P. EBERSOLE, a citizen of the United States, residing at Campbelltown, in the county of Lebanon and State of Pennsylvania, have invented new and useful Improvements in Links, of which the following is a specification.

This invention relates to links for chains and the like, the object in view being to produce a link embodying a movable section having a novel mounting in relation to the remainder of the link, whereby the link as a whole may be easily connected with and disconnected from another link or any device with which the link is associated.

With the above and other objects in view, the invention consists in the novel construction, combination and arrangement of parts, as herein described, illustrated and claimed.

Figure 1:
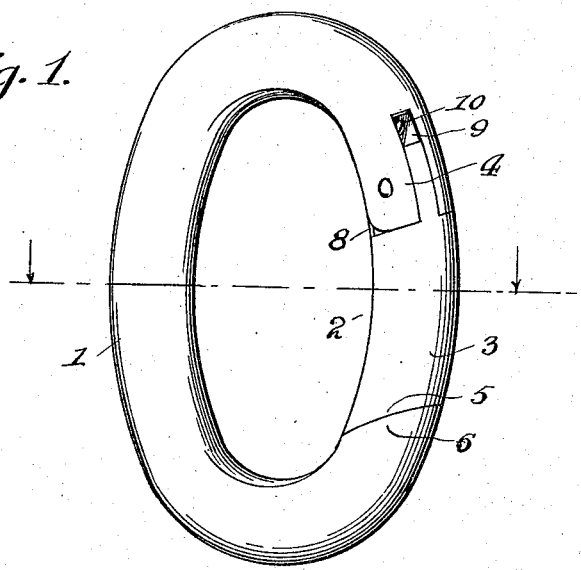
Figure 2:
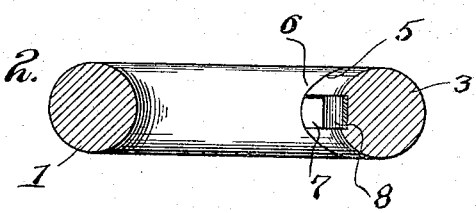
Figure 3:
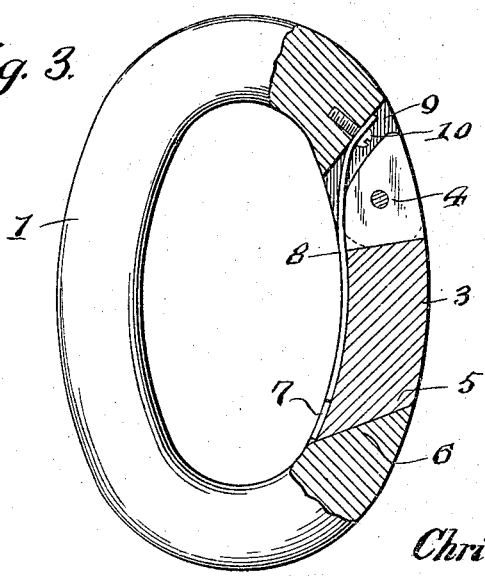

In the accompanying drawings: Figure 1 is a perspective view of a link embodying the present invention. Fig. 2 is a cross section through the movable section of the link showing the relation of the closing spring thereto. Fig. 3 is a section taken longitudinally of the link through the movable portion thereof, showing the closing spring and the manner of fastening the same to the main body of the link.

The main body of the link designated at 1 is substantially C-shaped, leaving an entrance opening or space 2 through which another link or its equivalent may be inserted and removed without difficulty.

The entrance space or opening 2 is normally closed by means of a complemental link section 3 which is connected at one end by a knuckle joint at 4 to the corresponding end of the main body of the link. The free end of the section 3 of the link is beveled as at 5 and the adjacent extremity of the main body of the link is correspondingly beveled as at 6, the beveled faces 5 and 6 forming meeting stop shoulders which limit the outward movement of the section 3 of the link and maintain the two sections of the link in alinement with each other.

The inner face of the section 3 of the link is formed with a longitudinal groove 7 in which is slidable the free end portion of a closing spring 8 having one end inserted through a slot 9 in one of the end portions of the main body of the link and secured therein by a fastener 10 shown in the form of a screw.

By reason of the construction above described, the closing spring is seated within the inner face of the movable section 3 of the link so as not to be injured by the adjoining link or links, the main bearing of such other link or links coming against the inner face of the movable section 3. Thus the efficiency of the closing spring is not impaired after long usage. At the same time the construction described enables the movable section of the link to swing inwardly either for the purpose of introducing another link therein or removing a link or its equivalent therefrom.

Having thus described my invention, I claim:—

In combination a C-shaped link being formed with a bifurcated portion at one end so as to provide a recess and lugs forming the sides of said recess, a link section formed with a tenon adapted to project into said recess and having shoulders adapted to engage said lugs, said link section and the opposite end of said C-shaped link being beveled and adapted to close against each other, a leaf spring of a width equal to the width of said recess projecting into the latter and secured fixedly against the inner edge thereof, said tenon being spaced from the secured end of said spring when said link section is closed against said link, said link section being formed with a longitudinal groove and said spring being curved so as to lie in said groove, bearing against said tenon and holding said link section closed, a pin pivotally connecting said tenon in said bifurcated portion of the link.

In testimony whereof I affix my signature in presence of two witnesses.

CHRISTIAN P. EBERSOLE.

Witnesses:
　D. C. SWOPE,
　CLAUDE ARNOLD.

Copies of this patent may be obtained for five cents each, by addressing the "Commissioner of Patents, Washington, D. C."